W. E. LAW.
DRAFT APPLIANCE FOR TRACTORS.
APPLICATION FILED JUNE 10, 1920.

1,377,839.

Patented May 10, 1921.
2 SHEETS—SHEET 1.

Inventor
William E. Law
by his Attorneys
Howson & Howson

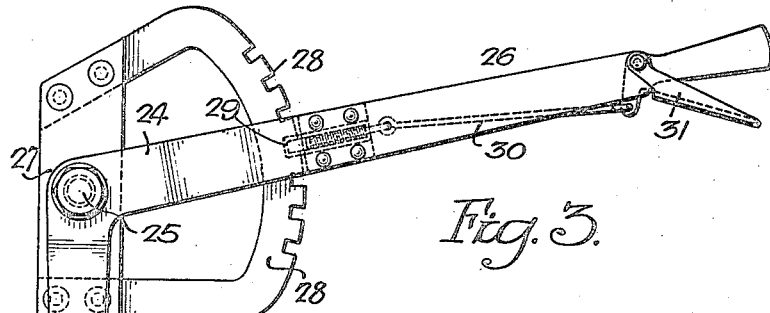
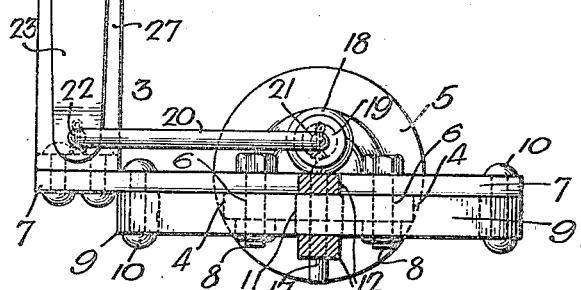
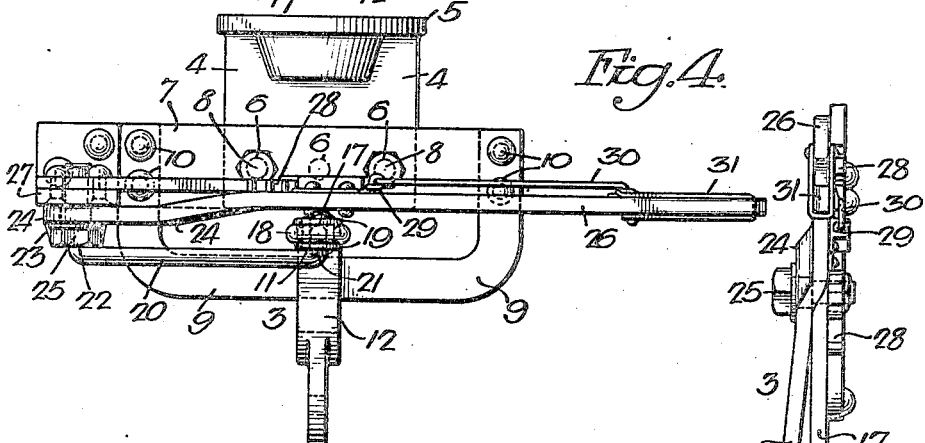
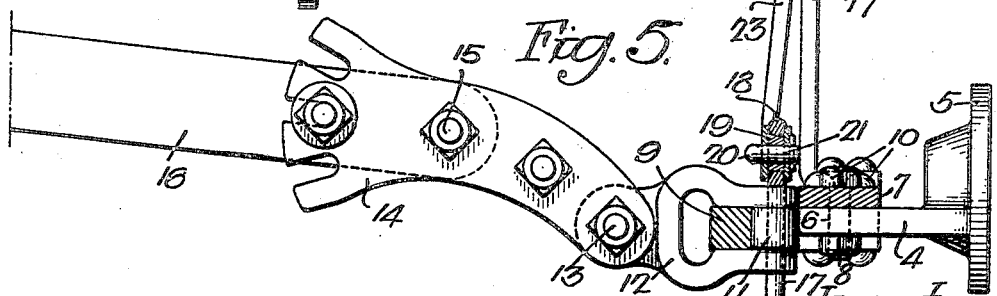

UNITED STATES PATENT OFFICE.

WILLIAM E. LAW, OF PHILADELPHIA, PENNSYLVANIA, ASSIGNOR OF ONE-HALF TO WILLIAM D. GASH, OF PHILADELPHIA, PENNSYLVANIA, AND ONE-HALF TO GIDEON M. STULL, OF CHESTER, PENNSYLVANIA.

DRAFT APPLIANCE FOR TRACTORS.

1,377,839.                Specification of Letters Patent.      Patented May 10, 1921.

Application filed June 10, 1920. Serial No. 387,946.

*To all whom it may concern:*

Be it known that I, WILLIAM E. LAW, a citizen of the United States, residing in Philadelphia, Pennsylvania, have invented certain Improvements in Draft Appliances for Tractors, of which the following is a specification.

One object of my invention is to construct a draft appliance which can be attached to, or form part of, a tractor by which an agricultural implement, such as a plow, can be connected to the tractor and can be adjusted, and to provide means for adjusting the connection between the plow and the tractor.

A further object of the invention is to construct the draft appliance so that it can be operated from the seat of the tractor.

A still further object of the invention is to provide a device that can be made comparatively cheap and which can be readily attached to the tractor.

Still another object of the invention is to provide an attachment between a tractor and a plow so that when the tractor is working on a side hill, the draft appliance can be adjusted so that the plow will not work down but will make a proper furrow.

In the accompanying drawings:

Fig. 3 is an end view of my improved draft appliance;

Fig. 4 is a plan view of the same; and

Fig. 5 is a side view, partly in section, showing the appliance secured to a bracket of a tractor and to the plow.

Figure 1:
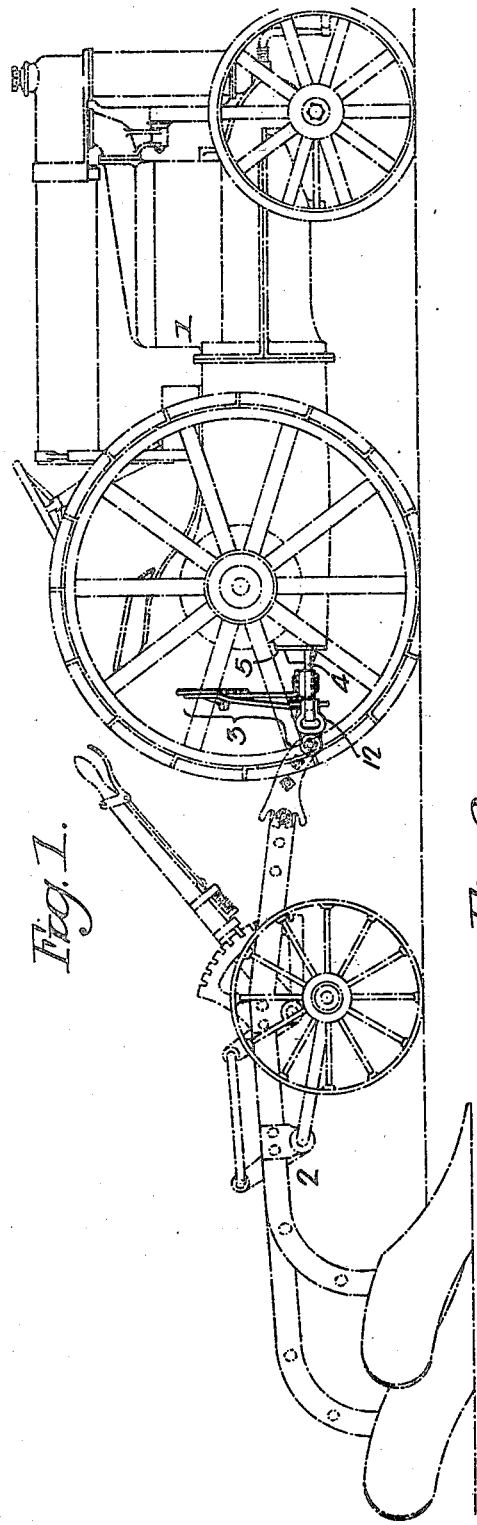
Figure 1 is a side view of a tractor and a plow attached thereto by my improved appliance, the draft appliance being in full lines and the tractor and plow being in dotted lines.
Figure 2:
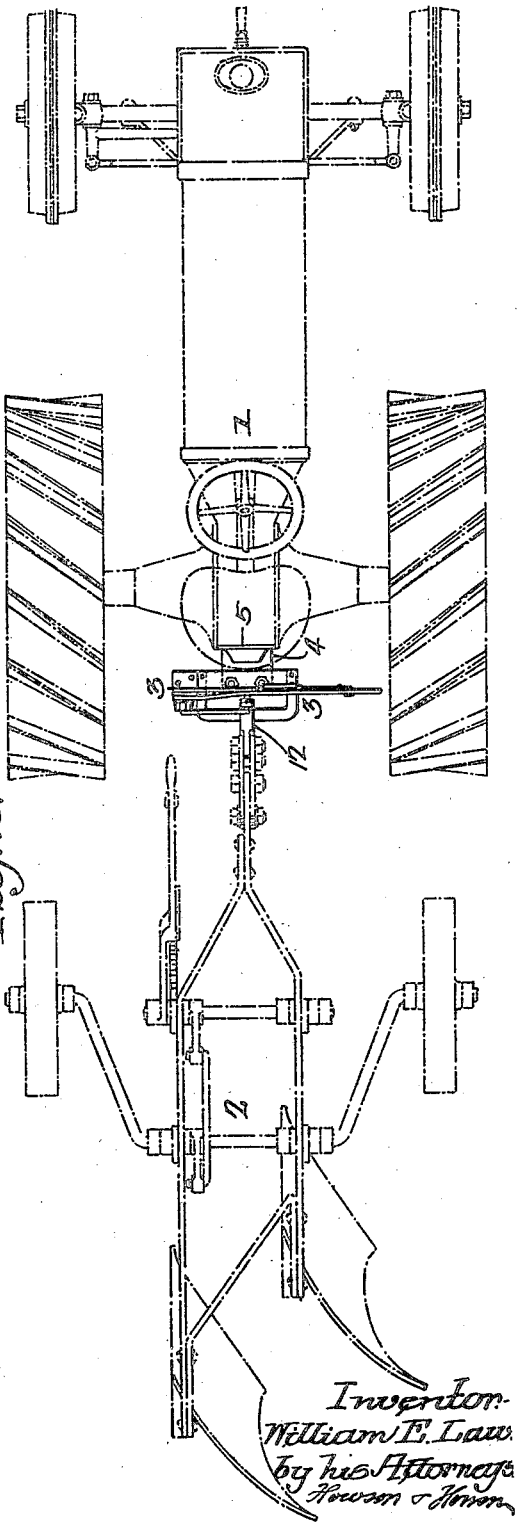
Fig. 2 is a plan view of the mechanism shown in Fig. 1.

Referring to the drawings, 1 is a tractor of the ordinary type. 2 is a plow. 3 is the draft appliance by which the plow is attached to the rear end of the tractor. The tractor, in the present instance, has a bracket 4 secured thereto, the bracket having a disk 5 by which it is firmly attached to the main casing of the tractor. In the present instance, in this bracket 4 are three holes 6. 7 is the base plate of the draft appliance having holes through which pass bolts 8, which also extend through the holes 6 in the bracket 4 of the tractor so that the plate 7 is rigidly secured to the tractor.

9 is a bar bent at each end, the ends being secured to the plate 7 by rivets 10. The main portion of the bar is spaced from the plate 8 so as to allow a roller 11 on the clevis 12 to travel in the slot thus formed. The clevis is attached to the plow, in the present instance, by a bolt 13, the bolt passing through an adjustable member 14 pivoted at 15 to the beam 16 of the plow. On the clevis is a pin 17, which extends through the roller 11 and has an eye 18 at its upper end in which is a flanged coupling block 19 through which extends the bent end 21 of a rod 20. The opposite end of the rod 20 is also bent, as at 22, and extends into an opening in the end of an arm 23 of a bell crank lever 24. This bell crank lever is pivoted at 25 and the arm 26 is provided with a handle. The pivot 25 is mounted on a standard 27 securely riveted to the plate 7 and the handle extends within easy access of an operator sitting on the seat of the tractor. By raising the arm 26, the clevis 12 is shifted to one side of the center and by lowering the handle 26 it is moved to the opposite side of the center. In the present instance, the handle is in the central position.

28 is a toothed segment secured to the standard 27. 29 is a spring bolt arranged to slide in the arm 26 and is connected by a rod 30 to a pivoted hand lever 31, which is located at the handle of the arm 26 so that when the handle is grasped the bolt is withdrawn, allowing the arm to be shifted, as desired, and on releasing the hand lever the bolt will enter one of the notches in the segments and will hold the parts in the position in which they are adjusted.

By this means, I provide a simple yet substantial device which can be applied to a tractor for connecting a plow, or like implement, to the tractor.

By operating the hand lever, the nose of the plow can be shifted in respect to the tractor. This is especially applicable when the plow is on a side hill. When the parts are centrally alined, the plow has a tendency to work down hill. By adjusting the draft appliance so that the nose of the plow will be turned up hill, the amount of adjustment depending upon the steepness of the hill, the plow will remain in correct position to the furrow.

On referring to the drawings, it will be seen that the standard is of such a height and the handle of the bell crank lever is so positioned that it is within easy reach of the operator of the tractor so that the clevis can be adjusted laterally on the bar to any position desired by the operator without leaving his seat.

The device is so constructed that it can be readily applied to other types of tractors, particularly those having a bracket, or other projection, at the rear.

I claim:

1. The combination in a draft appliance for tractors, of a plate arranged to be secured to a bracket on the tractor; a bar bent at each end, the ends being secured to the plate, the body of the bar being spaced from the plate; a roller mounted in this space; a clevis on the bar, said clevis having a pivot pin carrying the roller and arranged to be attached to the beam of a plow, or other implement; a vertical standard secured to one end of the plate; a bell crank lever pivoted to the standard, one arm of said lever extending to a point near the plate, and the other arm extending laterally back of the seat of the tractor in the form of a handle and in such position that it may be readily manipulated by the operator of the tractor; a rod connecting the first named arm of the bell crank lever to the pin; a toothed segment on the standard; and a hand operated bolt on the handle portion of the bell crank lever arranged to engage the teeth of the segment.

2. The combination in a draft appliance for tractors, of a plate arranged to be secured to a bracket at the rear of the tractor; a bar extending parallel with the plate and bent at each end, the bent ends being secured to the plate; a clevis mounted on the bar; a roller carried by the clevis, said clevis having a pivot pin extending through the roller, the pin having an eye at the upper end; a swivel block mounted in the eye; a standard projecting upwardly at one side of the plate; a bell crank lever pivoted to the standard, one arm of the bell crank lever extending downward; a rod bent at both ends, one end being attached to an arm of the lever, the other end extending through the swivel block in the eye of the pin, the other arm of the bell crank lever extending laterally back of the seat of the tractor and in such position that it can be manipulated by the operator of the tractor; a toothed segment on the standard; and a bolt on the handle of the lever engaging the teeth of the segment so that the lever can be locked in the position to which it is adjusted in order to hold the clevis in the proper position.

3. In a hitching device, the combination with a bracket to be secured to a tractor, of a horizontal rail rigid with said bracket, a trolley mounted on said rail and constituting a hitching member, a pivoted lever carried by said bracket, a pivoted link connecting said lever with the trolley, a toothed segment, and a detent carried by said lever to engage the toothed segment.

4. In a hitching device, the combination with a bracket to be secured to a tractor, and a segment frame rigid with said bracket, of a horizontal rail rigid with the bracket, a trolley straddling said rail and constituting a hitching member, an L-shaped lever pivoted to said segment frame and carrying a detent coöperable therewith, and a pivoted link connecting one member of said lever with said trolley.

WILLIAM E. LAW.